United States Patent
Jost et al.

(10) Patent No.: US 9,857,439 B2
(45) Date of Patent: Jan. 2, 2018

(54) SENSOR ARRANGEMENT, CIRCUIT ARRANGEMENT AND METHOD OF MANUFACTURING A SENSOR ARRANGEMENT

(71) Applicant: Infineon Technologies AG, Neubiberg (DE)

(72) Inventors: Franz Jost, Stuttgart (DE); Holger Wille, Neutraubling (DE); Martin Gruber, Schwandorf (DE)

(73) Assignee: Infineon Technologies AG, Neubiberg (DE)

( * ) Notice: Subject to any disclaimer, the term of this patent is extended or adjusted under 35 U.S.C. 154(b) by 80 days.

(21) Appl. No.: 14/994,170

(22) Filed: Jan. 13, 2016

(65) Prior Publication Data
US 2016/0216342 A1    Jul. 28, 2016

(30) Foreign Application Priority Data
Jan. 23, 2015    (DE) .................. 10 2015 100 991

(51) Int. Cl.
*G01R 33/02*    (2006.01)
*G01R 33/09*    (2006.01)
(Continued)

(52) U.S. Cl.
CPC ....... *G01R 33/091* (2013.01); *G01R 33/0052* (2013.01); *G01R 33/093* (2013.01);
(Continued)

(58) Field of Classification Search
CPC .......... G06F 1/00; G06F 2101/00; H01F 1/00; G01R 1/00; H01L 21/00; H01L 2221/00
See application file for complete search history.

(56) References Cited

U.S. PATENT DOCUMENTS

| | | |
|---|---|---|
| 5,621,377 A | 4/1997 | Dettmann et al. |
| 6,636,029 B1 | 10/2003 | Kunze et al. |

(Continued)

FOREIGN PATENT DOCUMENTS

| | | |
|---|---|---|
| DE | 4300605 C2 | 12/1994 |
| DE | 19838536 A1 | 3/2000 |

(Continued)

*Primary Examiner* — Huy Q Phan
*Assistant Examiner* — Temilade Rhodes-Vivour
(74) *Attorney, Agent, or Firm* — Viering, Jentschura & PartnermbB

(57) ABSTRACT

A sensor arrangement is provided. The sensor arrangement may include at least one sensor element having a first side and a second side opposite the first side and configured for sensing a magnetic field; and an electrically conductive line, wherein a first portion of the electrically conductive line may be arranged on the first side of the at least one sensor element and a second portion of the electrically conductive line may be arranged on the second side of the at least one sensor element in such a way that if a current is flowing through the electrically conductive line, the current has a first direction in the first portion and a second direction opposite the first direction in the second portion, such that a first magnetic field formed by the current in the first portion and a second magnetic field formed by the current in the second portion may at least partly add constructively at a sensing portion of the at least one sensor element.

20 Claims, 7 Drawing Sheets

(51) Int. Cl.
   *G01R 33/00*        (2006.01)
   *H01L 43/12*        (2006.01)
   *G06F 1/00*          (2006.01)
   *H01L 21/00*        (2006.01)

(52) U.S. Cl.
   CPC ............... *H01L 43/12* (2013.01); *G06F 1/00* (2013.01); *G06F 2101/00* (2013.01); *H01L 21/00* (2013.01)

(56) References Cited

U.S. PATENT DOCUMENTS

| | | | | |
|---|---|---|---|---|
| 2006/0202692 | A1* | 9/2006 | Tatschl | G01L 25/00 324/252 |
| 2006/0219436 | A1* | 10/2006 | Taylor | G01R 15/202 174/529 |
| 2007/0063690 | A1* | 3/2007 | De Wilde | G01R 15/20 324/117 R |
| 2007/0120209 | A1* | 5/2007 | Phan Le | G11C 11/16 257/427 |
| 2010/0301835 | A1 | 12/2010 | Kasajima | |
| 2012/0293170 | A1 | 11/2012 | Nakajima et al. | |
| 2014/0111195 | A1* | 4/2014 | Kuo | G01R 33/098 324/252 |
| 2014/0266170 | A1* | 9/2014 | Seeger | G01P 15/08 324/227 |

FOREIGN PATENT DOCUMENTS

| | | |
|---|---|---|
| DE | 602004011995 T2 | 4/2009 |
| NO | 2005064356 A2 | 7/2005 |

* cited by examiner

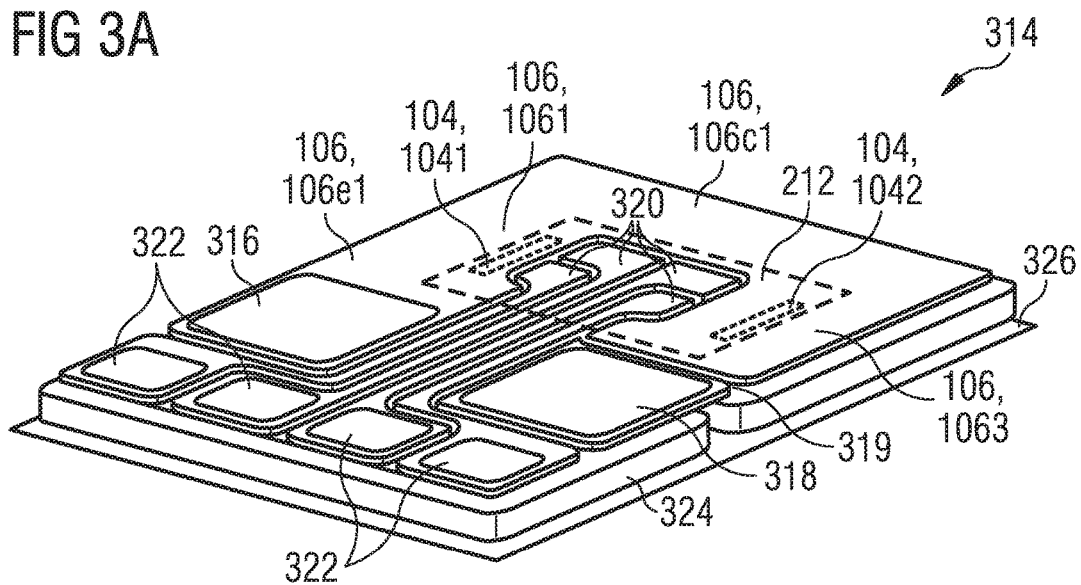
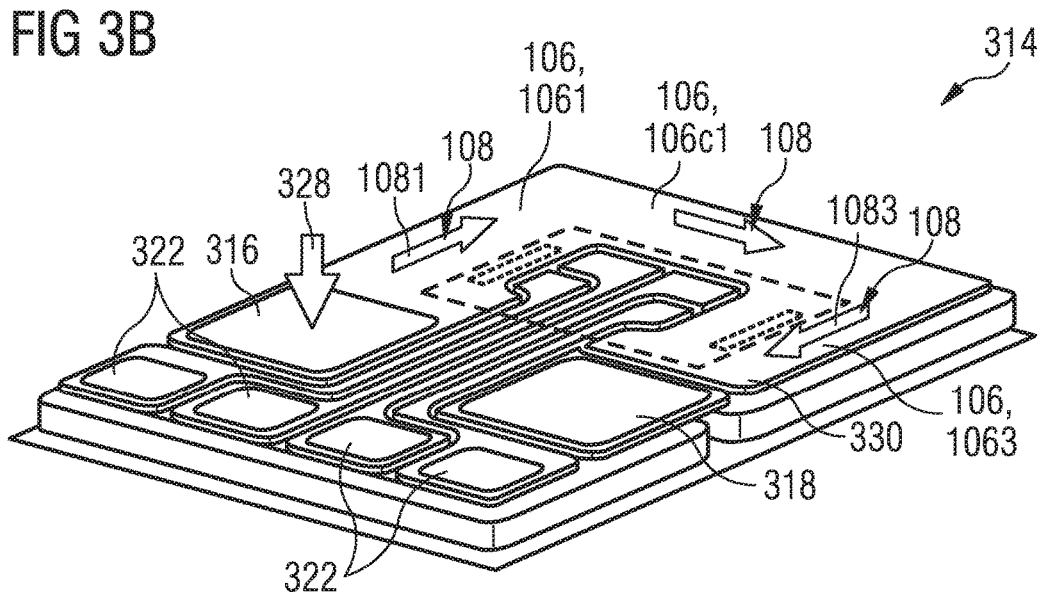

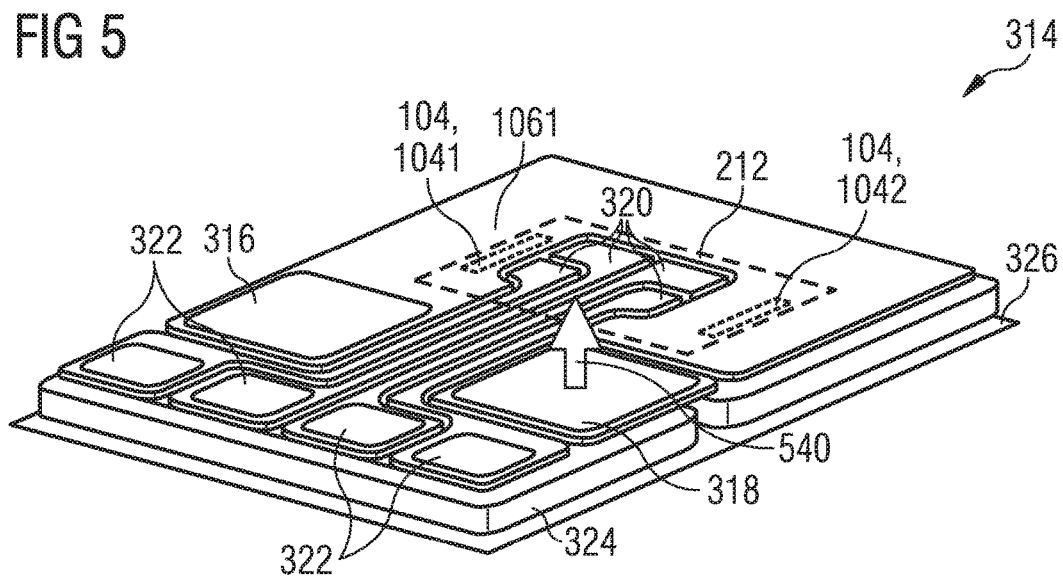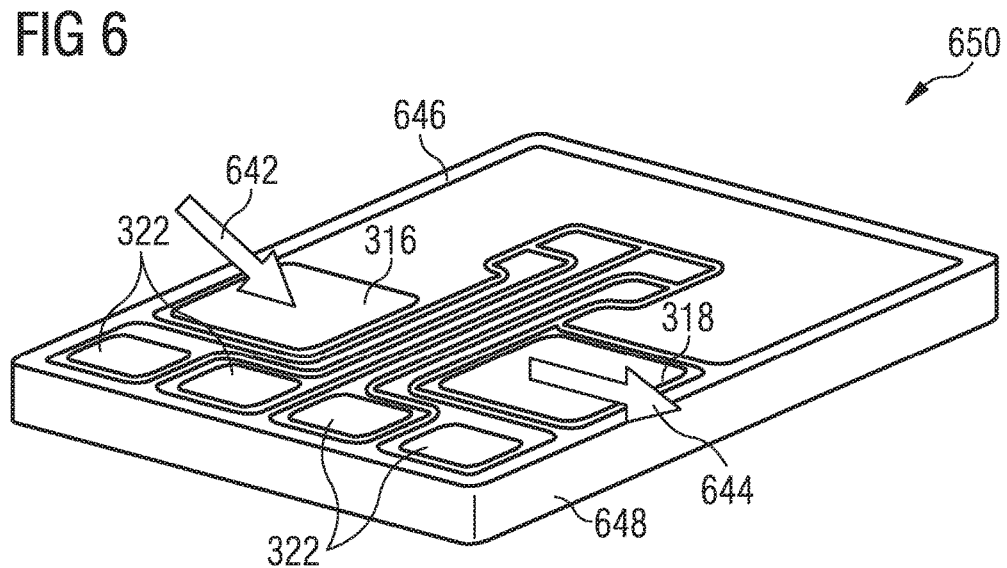

SENSOR ARRANGEMENT, CIRCUIT ARRANGEMENT AND METHOD OF MANUFACTURING A SENSOR ARRANGEMENT

CROSS-REFERENCE TO RELATED APPLICATION

This application claims priority to German Patent Application Serial No. 10 2015 100 991.9, which was filed Jan. 23, 2015, and is incorporated herein by reference in its entirety.

TECHNICAL FIELD

Various embodiments relate generally to a sensor arrangement, a circuit arrangement and to a method of manufacturing a sensor arrangement.

BACKGROUND

Magnetic field sensors of a magneto-resistive type, e.g. of an XMR (X-Magneto-Resistive) type, eg. AMR (Anisotropic Magneto-Resistance), GMR (Giant Magneto-Resistance) and/or TMR—(Tunnel Magneto-Resistance-) sensors, may provide a possibility for measuring a strength of an electric current. In the magnetic field sensor, an effect (also referred to as a magneto-resistive effect) may be exploited of a ferromagnetic material changing its resistivity if it is influenced by a magnetic field of an electrical conductor (e.g. an electrically conductive line) in which a current is flowing (also referred to as a live conductor). For using the effect, it may be required to arrange the (e.g. live) conductor as close as possible to sensor elements of the magnetic field sensor and to measure a change in resistivity, e.g. while a current is flowing in the conductor and/or when the current begins to flow. A measurement of the current in the sensor, e.g. the XMR-sensor, may be galvanically separated from a circuit including the (e.g. live) conductor.

At present, for example as shown in FIG. 1 (showing an example of a circuit board 101 with an integrated sensor 102 beneath a live conductor 106), an electrically conductive line 106, e.g. a (e.g. live) conductor, may be U-shaped. The conductive line 106 may be arranged, e.g. in a housing, on one side of, e.g. above, a (e.g. micro-) chip 102 that may serve as a carrier for ferromagnetic sensors 104. Using this setup/method, an analyzable sensor resistivity (and thus a precision of a measurement of a current 108 indicated in FIG. 1 as an arrow) may depend on a strength of a magnetic field 110 present at the ferromagnetic sensors 104.

SUMMARY

A sensor arrangement is provided. The sensor arrangement may include at least one sensor element having a first side and a second side opposite the first side and configured for sensing a magnetic field; and an electrically conductive line, wherein a first portion of the electrically conductive line may be arranged on the first side of the at least one sensor element and a second portion of the electrically conductive line may be arranged on the second side of the at least one sensor element in such a way that if a current is flowing through the electrically conductive line, the current has a first direction in the first portion and a second direction opposite the first direction in the second portion, such that a first magnetic field formed by the current in the first portion and a second magnetic field formed by the current in the second portion may at least partly add constructively at a sensing portion of the at least one sensor element.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 3A and FIG. 3B show perspective views of a sensor arrangement according to various embodiments;

FIG. 5 shows a perspective view of a sensor arrangement according to various embodiments;

FIG. 6 shows a perspective view of a sensor arrangement according to various embodiments;

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various aspects of the disclosure are provided for devices, and various aspects of the disclosure are provided for methods. It will be understood that basic properties of the devices also hold for the methods and vice versa. Therefore, for sake of brevity, duplicate description of such properties may have been omitted.

In various embodiments, in a sensor arrangement, an electrically conductive line may be arranged to pass at least one sensor element twice (or, generally, multiple times). For a relative arrangement of the line with respect to the at least one sensor element, a magnetic field of a current that may be passing through the electrically conductive line may be taken into account in such a way that two/multiple portions of the magnetic field of the electrically conductive line add in a region of the at least one sensor element, thereby leading to a stronger magnetic field and thus to a stronger signal (for example, a larger change of electrical resistivity) created in the at least one sensor element. A more accurate measurement, e.g. of the current, e.g. of a strength of the current, may thereby be made possible.

Figure 2:
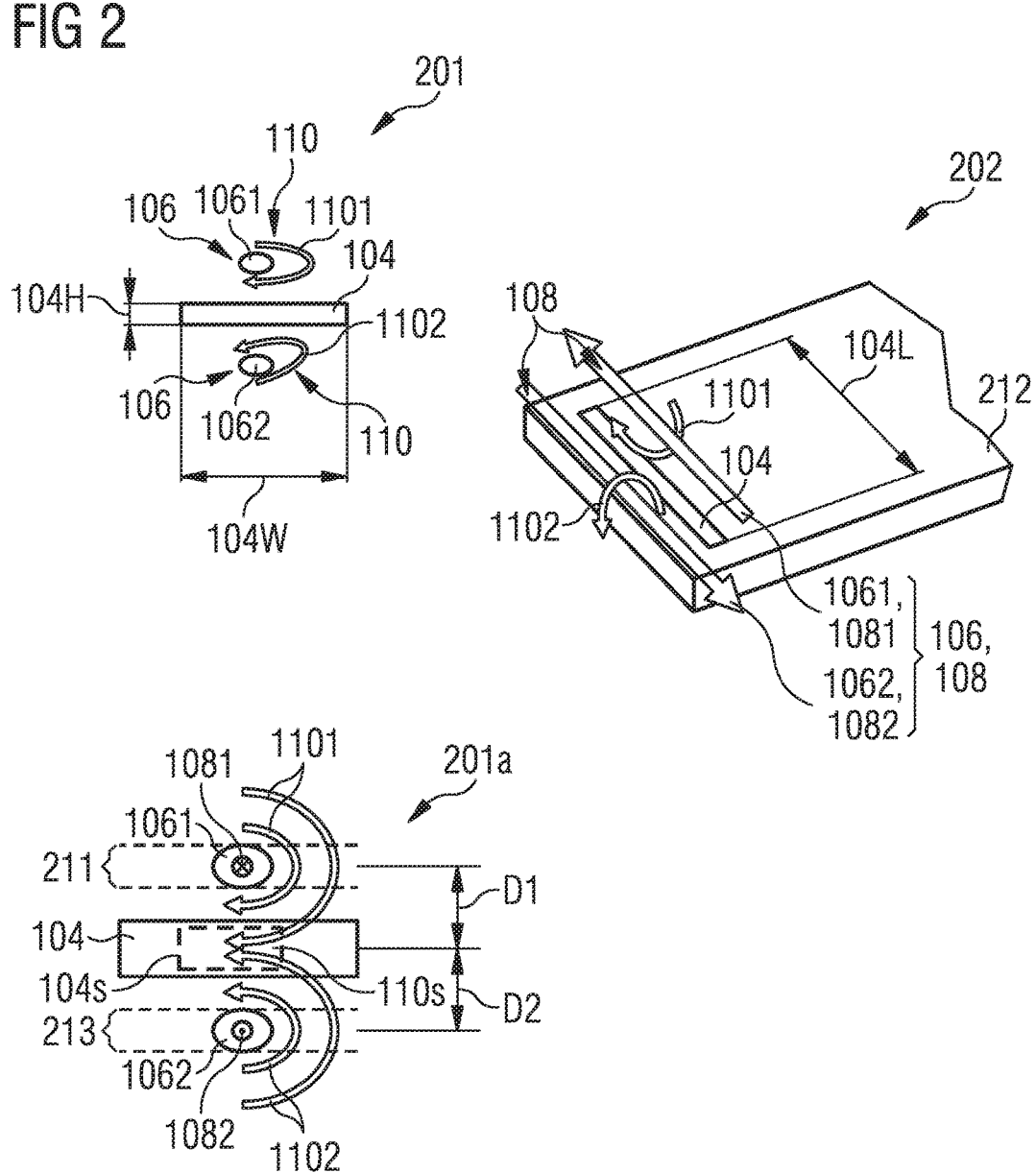
FIG. 2 shows schematic cross-sectional views and a schematic perspective view of a sensor arrangement according to various embodiments.

FIG. 2 shows two schematic cross-sectional views 201, 201a and a schematic perspective view 202 of a sensor arrangement according to various embodiments.

As shown in FIG. 2, in various embodiments, the sensor arrangement may include at least one sensor element 104, and an electrically conductive line 106.

In various embodiments, the at least one sensor element 104 may be configured for sensing a magnetic field. In other words, the at least one sensor element 104 may include or essentially consist of a magnetic field sensor element, for example a magnetic field sensor element of a magnetoresistive type, e.g. of an XMR (X-Magneto-Resistive) type, e.g. an AMR (Anisotropic Magneto-Resistance), GMR (Giant Magneto-Resistance) and/or TMR—(Tunnel Magneto-Resistance-) sensor element. The at least one sensor element 104 may be configured to have a magnetic field dependent resistivity, e.g. an electrical resistivity. In various embodiments, at least a sensing portion 104s of the at least one sensor element 104 may have a first electrical resistivity when a magnetic field at the sensing portion has a first magnetic field strength, and at least the sensing portion 104s of the at least one sensor element 104 may have a second electrical resistivity when the magnetic field at the sensing portion 104s has the second magnetic field strength, and so forth. The electrical resistivity of the at least one sensor element 104 (or at least of its sensing portion 104s, respectively) may be determined. The electrical resistivity may be referred to as a sensing signal, a sensor signal, or simply as a signal (of the at least one sensor element 104 or of the sensing portion 104s of the at least one sensor element 104, respectively).

The at least one sensor element 104 may have a first side and a second side opposite the first side.

The at least one sensor element 104 may have a height 104H (also referred to as a thickness of the at least one sensor element 104) in a range from about 20 nm to about 70 nm, e.g. around 30 nm. The at least one sensor element 104 may have a width 104 W in a range from about 1.3 μm to about 7 μm, e.g. in a range from about 3 μm to about 5 μm. The at least one sensor element 104 may have a length 104L in a range from about 100 μm to about 5 mm, e.g. in a range from about 500 μm to about 2 mm.

The electrically conductive line 106 may, in various embodiments, include or essentially consist of an electrically conductive material, for example a metal or a metal alloy. The electrically conductive line 106 may for example include at least one of a group of electrically conductive materials including copper, gold, silver, aluminum, a copper alloy, a gold alloy, a silver alloy and an aluminum alloy.

In various embodiments, the electrically conductive line 106 may have a thickness in a range from about 10 nm to about 5 mm, e.g. from about 1 μm to about 100 μm, e.g. from about 10 μm to about 70 μm. The electrically conductive line 106 may have a width in a range from about 1 μm to about 1 mm, e.g. from about 100 μm to about 500 μm. In various embodiments, the width of the electrically conductive line 106 may be uniform along a length of the electrically conductive line. In various embodiments, the width of the electrically conductive line 106 may not be uniform (in other words, may vary) along a length of the electrically conductive line 106.

In various embodiments, a first portion 1061 of the electrically conductive line 106, which may also simply be referred to as the first portion 1061, may be arranged on the first side of the at least one sensor element 104. In FIG. 2, the first side of the at least one sensor element 104 may be above the at least one sensor element 104. Thus, the first portion 1061 of the electrically conductive line 106 may at least partially be arranged above, e.g. on or over, the at least one sensor element 104. For example, the first portion 1061 may be arranged to be at least partially essentially parallel or parallel to the at least one sensor element 104.

In various embodiments, a second portion 1062 of the electrically conductive line 106, which may also simply be referred to as the second portion 1062 (the term "of the electrically conductive line 106" may also be omitted when referring to other portions of the electrically conductive line 106) may be arranged on the second side of the at least one sensor element 104. In FIG. 2, the second side of the at least one sensor element 104 may be below the at least one sensor element 104. Thus, the second portion 1062 of the electrically conductive line 106 may at least partially be arranged under the at least one sensor element 104. By way of example, the second portion 1062 may be arranged to be at least partially essentially parallel or parallel to the at least one sensor element 104.

In various embodiments, the first portion 1061 and the second portion 1062 of the electrically conductive line 106 may be arranged such that a hypothetical plane extending in a direction of the length 104L and the height 104H of the at least one sensor element 104 and cutting lengthwise through the at least one sensor element 104 may also cut, e.g. lengthwise, through the first portion 1061 and the second portion 1062 of the electrically conductive line 106.

In various embodiments, the electrically conductive line 106 may be configured to have an electrical current 108 (which may simply be referred to as current 108) flowing though it. If the current 108 is flowing through the electrically conductive line 106, the current 108 may have a first direction 1081 in the first portion 1061 and a second direction 1082 opposite the first direction 1081 in the second portion 1062.

In various embodiments, the electrical current 108 in the electrically conductive line 106 may be flowing in just one direction with respect to the conductive line between a first end of the conductive line 106 and a second end of the conductive line 106 (the first end and the second end are not shown in FIG. 2), i.e. essentially parallel to a length of the conductive line 106 and pointing in a direction of either the first end or the second end, corresponding for example to a direction of a conventional current, i.e. from positive to negative. However, an arrangement of the conductive line 106, for example of the first portion 1061 and of the second portion 1062, may be such that a direction (for example with respect to an abstract three-dimensional space in which the sensor arrangement may be arranged) of the current 108 in the first portion 1061 of the conductive line 106 may be the first direction 1081, and a direction of the current 108 in the second portion 1062 of the conductive line 106 may be the second direction 1082 (opposite to the first direction 1081).

The first portion 1061 of the electrically conductive line 106 with its corresponding first direction 1081 of the electrical current 108 is schematically indicated in view 202 by an arrow pointing to the top left. This may indicate that the first portion 1061 of the electrically conductive line 106 is arranged essentially parallel to the at least one sensor element 104 (which is shown extending also in a top left-bottom right direction). In the first portion 1061 of the electrically conductive line 106, the electrical current 108 may be flowing in the first direction 1081, e.g. to the top left of view 202. The first direction 1081 may be essentially parallel to the at least one sensor element 104.

The second portion 1062 of the electrically conductive line 106 with its corresponding second direction 1082 of the electrical current 108 is schematically indicated in view 202 by an arrow pointing to the bottom right. This may indicate that the second portion 1062 of the electrically conductive line 106 is arranged essentially parallel to the at least one sensor element 104. In the second portion 1062 of the electrically conductive line 106, the electrical current 108 may be flowing in the second direction 1082, e.g. to the bottom right of view 202, which may be essentially opposite to the top-left-direction 1081 of the current 108 in the first portion 1061. The second direction 1082 may be essentially parallel to the at least one sensor element 104. In addition, the second direction 1082 may be essentially parallel (but opposite) to the first direction 1081.

An electrical current is known to generate a magnetic field. The so-called right-hand grip rule may be used for determining a (definition for a) direction of the magnetic field formed by the electrical current: Pointing a thumb of a right hand in a conventional (i.e., from positive to negative) flowing direction of the electrical current, the fingers of the right hand point in the direction of the magnetic field, e.g. of magnetic field lines.

In various embodiments, if a current 108 is flowing in the electrically conductive line 106, the current 108 may form a magnetic field 110. In the first portion 1061 of the electrically conductive line 106, the electrical current 108 with the direction 1081 may form a first portion of the magnetic field 110, which may also be referred to as the first magnetic field 1101. In the second portion 1062 of the electrically conductive line 106, the electrical current 108 with the direction 1082 may form a second portion of the magnetic field 110, which may also be referred to as the second magnetic field 1102.

In various embodiments, the first magnetic field 1101 formed by the current 108 in the first portion 1061 of the electrically conductive line 106 and the second magnetic field 1102 formed by the current 108 in the second portion 1062 of the electrically conductive line may at least partly add constructively at a sensing portion 104s of the at least one sensor element 104. A superposition of the magnetic fields formed around the first portion 1061 and the second portion 1062 of the electrically conductive line 106 may be described with reference to view 201a of FIG. 2. The first portion 1061 of the electrically conductive line 106 may extend into and out of the plane of the paper above the at least one sensor element 104, and the current 108 may have its direction (the first direction 1081) pointing into the plane of the paper, as indicated by a ⊗-symbol. The second portion 1062 of the electrically conductive line 106 may extend into and out of the plane of the paper below the at least one sensor element 104, and the current 108 may have its direction (the second direction 1082) pointing into the plane of the paper, as indicated by a symbol of a circle with a central dot.

As a consequence, the first magnetic field 1101 may have a direction as indicated in the view 201a of FIG. 2, circling from a top towards a right around the first portion 1061 of the electrically conductive line 106, e.g. like a right-handed screw. The second magnetic field 1102 may have a direction as indicated in the view 201a of FIG. 2, circling from a bottom towards a right around the first portion 1061 of the electrically conductive line 106, e.g. like a left-handed screw. The first magnetic field 1101 and the second magnetic field 1102 may be superposed at least at the sensing portion 104s of the at least one sensor element 104. At least at the sensing portion 104s, the first magnetic field 1101 and the second magnetic field 1102 may add constructively. In other words, a magnetic field strength of the superposition (e.g. a sum, e.g. a vector sum) of the first magnetic field 1101 and the second magnetic field 1102 may be higher than each of a magnetic field strength of the first magnetic field 1101 and the second magnetic field 1102 individually.

In other words, the first portion 1061 and the second portion 1062 of the electrically conductive line 106 may be arranged in such a way that if the current 108 is flowing in the electrically conductive line 106, it may have the first (e.g. spatial) direction 1081 in the first portion 1061 of the electrically conductive line 106 and the second (e.g. spatial) direction 1082 opposite to the first direction 1081 in the second portion 1062 of the electrically conductive line 106 (while the direction of the current 108 in the electrically conductive line 106 relative to the electrically conductive line 106 may be the same in all portions, e.g. the first portion 1061 and the second portion 1062, of the electrically conductive line, e.g. the conventional direction of the current, defined to flow from plus to minus). As a consequence of arranging the first portion 1061 and the second portion 1062 of the electrically conductive line such that the flowing current 108 may have the first direction 1081 in the first portion 1061 and the second direction 1082 in the second portion 1062, the first magnetic field 1101 that may be formed by the current 108 in the first portion 1061 may have an opposite direction from the second magnetic field 1102 that may be formed by the current 108 in the second portion 1062. By arranging the at least one sensor element 104 between the first portion 1061 and the second portion 1062 of the electrically conductive line 106, a constructive superposition of the first magnetic field 1101 and the second magnetic field 1102 may be achieved at a position of the at least one sensor element 104, e.g. at a position of the sensing portion 104s in the at least one sensor element 1. In view 201a, this may be visualized by arrows, labelled with 1101 and 1102, indicating the directions of the respective magnetic fields 1101, 1102. At the position of the at least one sensor element 104, both magnetic fields may have a general more or less same direction from a right side of the paper towards a left side of the paper, or at least they may not enter the at least one sensor element 104 from essentially opposite directions.

In various embodiments, the sensor arrangement having the first portion 1061 and the second portion 1062 of the electrically conductive line 106 arranged on opposite sides of the at least one sensor element 104, taking into account the directions of the respective magnetic fields forming in the first portion 1061 and the second portion 1062, respectively, such that the first magnetic field 1081 and the second magnetic field 1081 add constructively, may lead to a stronger combined magnetic field at least at the position of the sensing portion of the at least one sensor element 104, where it may be detected/measured, and thus to an increase of the signal of the at least one sensor element 104. Thereby, a measurement accuracy, for example for measuring the current strength of the current 108 that may flow through the electrically conductive line 106, for example using at least one XMR magnetic field sensor as the at least one sensor element 104, may be improved.

In various embodiments, the higher strength of the combined magnetic field and the stronger signal may be used for detecting/measuring signals that would have been below a measurement limit of a conventional sensor arrangement. The first magnetic field 1081 and the second magnetic field 1082 may for example combine to a combined magnetic field that may have a strength that may be just sufficient for generating a (e.g. significant) signal in the at least one sensor element 104, whereas either of the first magnetic field 1081 and the second magnetic field 1082 may not have been strong enough for generating a (e.g. significant) signal. In other words, a measurement range of the sensor arrangement according to various embodiments may be expanded, for example towards lower current strengths.

Figure 1:
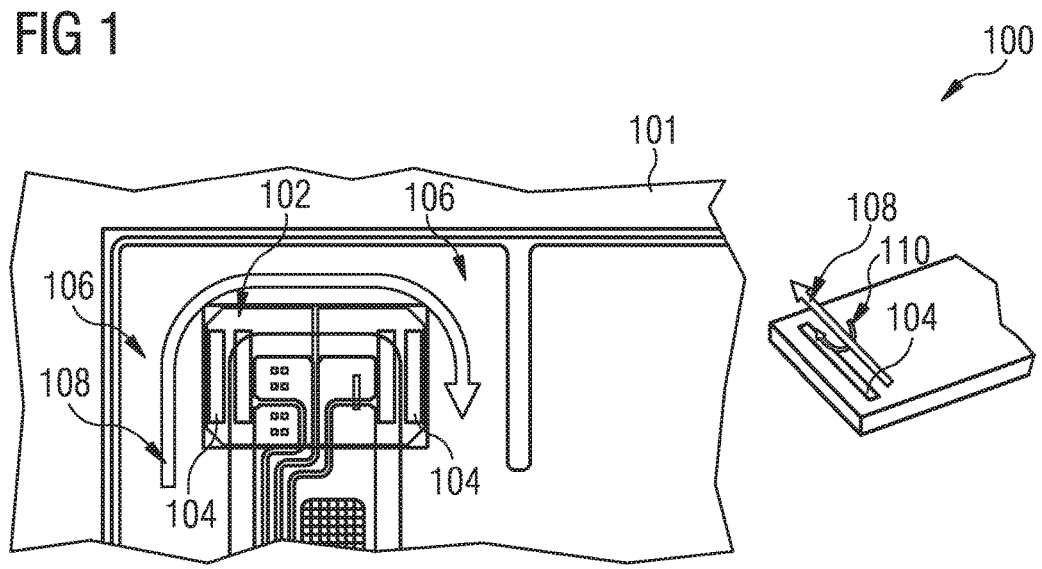
FIG. 1 shows a top view and a schematic perspective view of a known magnetic field sensor.

In various embodiments, an external magnetic field, e.g. a noise field, i.e. a field that may not be desired and may supposedly not be included in the signal, may have a structure of having the same structure and direction in the conventional sensor arrangement (e.g. as shown in FIG. 1) and in the sensor arrangement according to various embodiments, e.g. as shown in FIG. 2. As a consequence, a signal strength of a signal caused by the external magnetic field may not be increased (as compared to the conventional sensor arrangement), whereas the strength of the signal to be measured, which may be caused by the current 108 that may be flowing in the electrically conductive line 106 and the resulting magnetic fields 1081, 1082 of the first portion 1061 and the second portion 1062, may be increased. Thus, a robustness of the sensor arrangement with respect to external magnetic fields, e.g. noise fields, for example the earth magnetic field, may be improved. This may also be referred to as a signal-to-noise-ratio of the sensor arrangement according to various embodiments being improved.

In various embodiments, the sensor arrangement may be configured such that, for a lower limit of the current strength of the electrical current 108 desired to be detected and/or measured, the at least one sensor element 104, e.g. the sensing region 104s of the at least one sensing element 104, may create a signal, e.g. a signal that may be different from noise of the at least one sensor element 104, e.g. a signal that may be significantly different from the noise of the at least one sensor element 104. In various embodiments, a plurality of sensor elements 104 may be used for creating the signal, for example as described below.

In various embodiments, a group of parameters of the sensor arrangement one or more of which may be adjusted for obtaining a strong enough signal for a pre-defined lower limit of the current strength to be detected and/or measured may include a distance D1, D2 between the first portion 1061 of the electrically conductive line 106 and the at least one sensor element 104 and/or between the second portion 1062 of the electrically conductive line 106 and the at least one sensor element 104, respectively, a number of sensor elements 104, a size of the at least one sensor element 104, a material of the electrically conductive line 106, a size of the electrically conductive line 106, for example the size, e.g. the length, of the first portion 1061 and/or of the second portion 1062, and a material that may be arranged between the at least one sensor element 104 and the first portion 1061 and/or the second portion 1062 of the electrically conductive line 106.

In various embodiments, as for example shown in view 201a of FIG. 2, the at least one sensor element 104 may be arranged approximately in a middle between the first portion 1061 and the second portion 1062 of the electrically conductive element 106. In other words, the distance D1 between the at least one sensor element 104 and the first portion 1061 of the electrically conductive element 106 may be approximately equal to the distance D2 between the at least one sensor element 104 and the second portion 1062 of the electrically conductive element 106. In various embodiments, the distance D1 may be different from the distance D2.

In various embodiments, the first portion 1061 may be arranged in a first level 211 (indicated in view 201a of FIG. 2 as a region between dashed lines), for example in the first level 211 including a first metallization layer, e.g. a structured first metallization layer.

In various embodiments, the second portion 1062 may be arranged in a second level 213 (indicated in view 201a of FIG. 2 as a region between dashed lines), for example in the first level 213 including a first metallization layer, e.g. a structured first metallization layer.

FIG. 3A and FIG. 3B each show a perspective view of a sensor arrangement 314 according to various embodiments. One or more layers and/or parts of the sensor arrangement 314 may have been removed for revealing layers and/or parts that may be covered in the complete sensor arrangement 314.

The sensor arrangement 314 may be an embodiment of the sensor arrangement of FIG. 2. Principles, parts, parameters, materials etc. of the sensor arrangement 314 may be the same or similar to those described in context with FIG. 2 and may not be repeated here.

The sensor arrangement 314 may include at least one sensor element 104. In the embodiment as shown in FIG. 3A, the at least one sensor element 104 may include a first sensor element 1041 and a second sensor element 1042. The sensor arrangement 314 may further include a chip 212. The first sensor element 1041 and the second sensor element 1042 may be arranged on, e.g. formed in, the chip 212. The first sensor element 1041 and the second sensor element 1042 may be arranged below a first level 211 of the sensor arrangement 314 and may therefore be shown as dashed lines in FIG. 3A. See FIG. 4A for a view including the first sensor element 1041, the second sensor element 1042 and the chip 212 without one or more levels covering them.

In various embodiments, the sensor arrangement 314 may include an electrically conductive line 106. The electrically conductive line 106 may for example include metal, for example copper. The electrically conductive line 106 may, in various embodiments, include at least a portion of a metal layer, e.g. a copper layer, a copper alloy layer or an aluminum layer.

In various embodiments, the electrically conductive line 106 may include a first portion 1061, and a third portion 1063. The electrically conductive line 106 may further include a first connecting portion 106c1 connecting the first portion 1061 and the third portion 1063. In various embodiments, the electrically conductive line 106 may include a first extension portion 106e1. The first portion 1061 may be arranged above the first sensor element 1041. The third portion 1063 may be arranged above the second sensor element 1042.

The first portion 1061 of the electrically conductive line 106 may be arranged above the first sensor element 1041 essentially as described in context with FIG. 2. The first portion 1061 may be considered as being arranged on a first side of the first sensor element 1041. A long axis of the first portion 1061 may, in various embodiments, have essentially the same direction as a long axis of the first sensor element 1041. In the embodiment as shown in FIG. 3A, both, the first sensor element 1041 and the first portion 1061 may have their long axes extending essentially in a top right-bottom left direction. Similarly, the third portion 1063 of the electrically conductive line 106 may essentially be arranged above the second sensor element 1041 as described in context with the arrangement of the first portion 1061 with respect to the at least one sensor element 104 in FIG. 2. The third portion 1063 may be considered as being arranged on a first side of the second sensor element 1042. A long axis of the third portion 1063 of the electrically conductive line 106 may, in various embodiments, have essentially the same direction as a long axis of the second sensor element 1042. In the embodiment as shown in FIG. 3A, both, the second sensor element 1042 and the third portion 1063 may have their long axes extending essentially in a top right-bottom left direction. The first portion 1061 and the third portion 1063 may be electrically conductively connected by the first connecting portion 106c1. In the embodiment of FIG. 3A, the first connecting portion 106c1 may extend from the first portion 1061 to the third portion 1063. A long axis of the first connecting portion 106c1 may in various embodiments be essentially at a right angle to the long axis of the first sensor element 1041 and/or the third sensor element 1042. In other embodiments, an angle between the long axis of the first connecting portion 106c1 and the long axis of the first sensor element 1041 and/or the second sensor element 1042, respectively, may be different.

In various embodiments, the third portion 1063 and the first portion 1061 may be arranged in a common first level 211, e.g. the first level 211 as described in context with FIG. 2. Furthermore, the first extension portion 106e1 and/or the first connecting portion 106c1 may be part of the first level 211. In various embodiments, the first portion 1061, the third portion 1063, and optionally one or both of the first connecting portion 106c1 and the first extension portion 106e1 may be formed in a common process. For example, a structured metal layer including the first portion 1061, the third portion 1063, and optionally one or both of the first connecting portion 106c1 and the first extension portion 106e1, may be formed, e.g. by deposition, e.g. structured deposition or deposition followed by structuring, e.g. using photolithography and partial removal of the metal layer.

In various embodiments, the sensor arrangement 314 may further include a first connection pad 316. The electrically conductive line 106, e.g. the first portion 1061 of the electrically conductive line 106, may be electrically conductively connected to the first connection pad 316, which may also be referred to as input connection pad or input pad. The first extension portion 106e1 may extend, e.g. from the first portion 1061, towards the first connection pad 316, for example for enabling a forming of the electrically conductive connection between the first connection pad 316 and the electrically conductive line 106. The first connection pad 316 may for example be arranged at least partially on or above the first extension portion 106e1. The electrically conductive connection between the first connection pad 316 and the electrically conductive line may for example be formed by depositing the first contact pad 316 on the first extension portion 106e1 (as shown in FIG. 3A), by soldering the first connection pad 316 to the first extension portion, and other suitable means. The first connection pad 316 may, in various embodiments, include or essentially consist of an electrically conductive material, e.g. a metal or a metal alloy.

In various embodiments, the sensor arrangement 314 may further include a second connection pad 318. The electrically conductive line 106 may be electrically conductively connected to the second connection pad 318, which may also be referred to as output connection pad or output pad. However, an electrically conductive connection between the electrically conductive line 106 and the second connection pad 318 may not be provided by a lateral electrically conductive connection, e.g. a connection in a plane of the third portion 1063 and/or of the first portion 1061. Instead, an electrically conductive connection between the electrically conductive line 106 and the second connection pad 318 may be provided by at least one vertical interconnect access (also referred to as via), see FIG. 4A and FIG. 4B. The at least one via may be configured to electrically connect the second connection pad 318 to a portion of the electrically conductive line 106 that may be formed in a level, e.g. a layer, of the sensor arrangement 314 that may be different from a level, e.g. a layer, in which the first portion 1061 of the electrically conductive line may be formed. A dielectric material may be arranged in an insulation region 319 between the third portion 1063 and the second connection pad 318. The second connection pad 318 may include or essentially consist of an electrically conductive material, e.g. a metal or a metal alloy.

In various embodiments, as shown in FIG. 3A, the sensor arrangement 314 may include at least one sensor line 320. In the example shown in FIG. 3A, the sensor arrangement 314 may include four sensor lines 320. However, the sensor arrangement 314 may include any number of sensor lines 320. The at least one sensor line 320 may include or essentially consist of an electrically conductive material, e.g. a metal or a metal alloy, e.g. copper. The at least one sensor line 320 may, in various embodiments, be formed together with the first portion 1061 and/or with the third portion 1063. The at least one sensor line 320 may for example be formed as a portion of the metal layer from which the first portion 1061 and/or other portions (e.g. the third portion 1063 and/or the first connecting portion 106c1 and/or the first extension portion 106e1) of the electrically conductive line 106 may be formed.

In various embodiments, the sensor arrangement 314 may further include at least one sensor pad 322. The at least one sensor pad 322 may be electrically conductively connected to the at least one sensor line 320. In a case of the sensor arrangement 314 having a plurality of sensor lines 320, the sensor arrangement 314 may also include a plurality of sensor pads 322, and each sensor line of the plurality of sensor lines 320 may be connected to one sensor pad of the plurality of sensor pads 322. In the example shown in FIG. 3A, the sensor arrangement 314 may include four sensor pads 322. However, the sensor arrangement 314 may include any number of sensor pads 322. The at least one sensor pad 322 may include or essentially consist of an electrically conductive material, e.g. a metal or a metal alloy, e.g. copper. The at least one sensor pad 322 may, in various embodiments, be formed together with the first connection pad 316 and/or with the second connection pad 318.

In various embodiments, the metal layer from which the first conducting portion 1041 and the third conducting portion 1063 may be structured, e.g. using photolithography, by arranging dielectric separation regions between portions of the electrically conductive material of the first level 211 that may not have direct electrically conductive contact. For example, as shown in FIG. 3A and FIG. 3B, between the third portion 1063 and a portion of the metal layer on which the second connection pad 318 may be arranged, a gap 319 (which may be filled by a dielectric material, e.g. air, a dielectric oxide, a dielectric polymer, or the like) may be formed. Similarly, between the at least one sensor line 320 and each of the first conducting portion 1061, the third conducting portion, and the first extension portion 106e1, at least one dielectric separation region may be arranged.

In various embodiments, by structuring the electrically conductive line 106, e.g. the electrically conductive layer, of the sensor arrangement 314, a direction of an electrical current 108 that may flow through the electrically conductive line 106 may be defined. The current 108 may thus have a first direction 1081 in the first portion 1061. The current 108 may further have a third direction 1083 in the third portion 1063. The first direction 1081 and the second direction 1082 are indicated by arrows in FIG. 3B. In the embodiment shown in FIG. 3B, the third direction 1083 may be essentially opposite to the first direction 1081. In various embodiments, the third direction 1083 and the first direction 1081 may be arranged with a different relative orientation of the first direction 1081 and the third direction 1083.

In various embodiments, the at least one sensor line 320 may be configured to conduct a signal, for example a raw signal that may be created by the at least one sensor element 104, and/or a processed signal, which may for example include a processing result of the raw signal that may have been processed, e.g. by the chip 212, to form the processed signal, and/or the signal may, in a case of the sensor arrangement 314 including a plurality of (e.g. four) sensor elements 104, be a signal resulting from a bridge configuration of the plurality of sensor elements 104. In various embodiments, the plurality of sensor elements 104 may be coupled in a bridge configuration providing a cumulative signal from the plurality of sensor elements 104.

In the following, unless explicitly specified, the term "signal" may refer to any of a raw signal and/or a processed signal and/or a cumulative signal. In various embodiments, the at least one sensor line 320 may further be used for providing information to the at least one sensor element 104 and/or to the chip 212, for example calibration information, a command for determining a type of desired output (e.g. switching between the raw signal and the processed signal), and the like.

In various embodiments, the at least one sensor line 320 may be configured to conduct the signal between the at least one sensor element 104 and/or the chip 212, respectively, and the at least one sensor pad 322. The at least one sensor pad 322 may be configured to make the signal accessible from an outside of the sensor arrangement 314, and optionally to allow for the providing information. For example, the at least one sensor pad 322 may be left uncovered by an encapsulation of the sensor arrangement 314 (not shown here, but see FIG. 6 for an example) and may be electrically contacted from the outside, for example by a bonding wire, e.g. a copper bonding wire, or other known means of contacting from the outside.

Figure 4A:
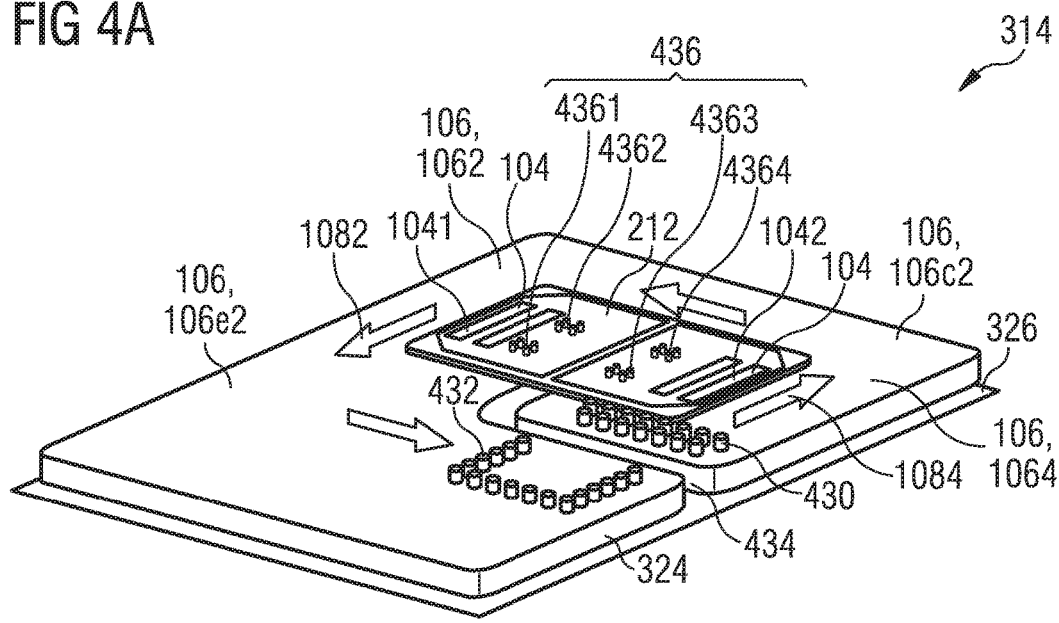
FIG. 4A and FIG. 4B show perspective views of a sensor arrangement according to various embodiments.
Figure 4B:
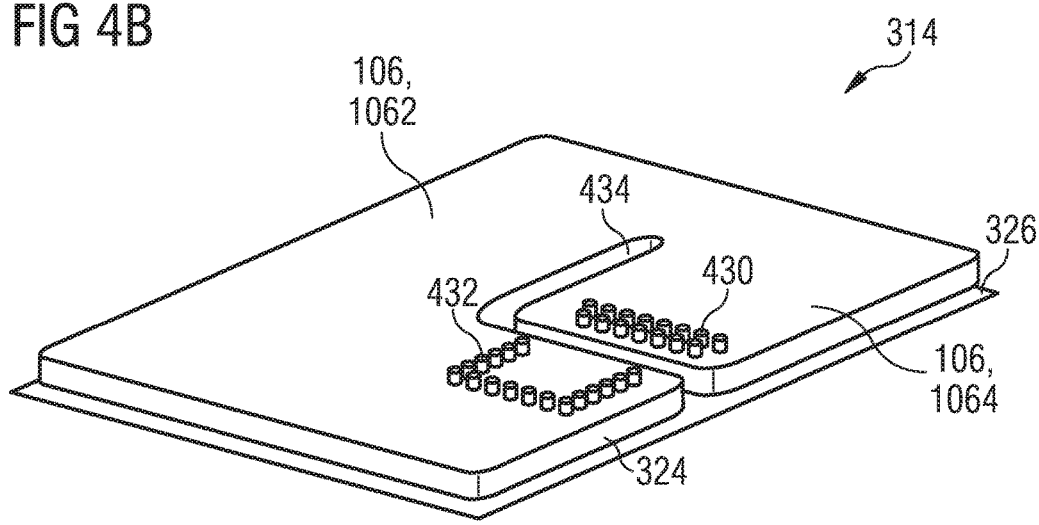

FIG. 4A and FIG. 4B show perspective views of a sensor arrangement 314 according to various embodiments. The sensor arrangement 314 may be the sensor arrangement of FIG. 3A and FIG. 3B, having one or more levels, e.g. layers, removed for displaying one or more levels of the sensor arrangement 314 that would otherwise be at least partially covered by the removed level.

In various embodiments, the electrically conductive line 106 of the sensor arrangement 314 may include a second portion 1062 and a fourth portion 1064. The electrically conductive line 106 may further include a second connecting portion 106c2 electrically conductively connecting the second portion 1062 with the fourth portion 1064 and/or a second extension portion 106e2.

The second portion 1062 may be arranged below the first sensor element 1041. The fourth portion 1064 may be arranged below the second sensor element 1042.

The second portion 1062 of the electrically conductive line 106 may be arranged below the first sensor element 1041 essentially as described in context with FIG. 2. The second portion 1062 may be considered as being arranged on a second side of the first sensor element 1041. A long axis of the second portion 1062 may, in various embodiments, have essentially the same direction as a long axis of the first sensor element 1041. In the embodiment as shown in FIG. 3A, both, the first sensor element 1041 and the second portion 1062 may have their long axes extending essentially in a top right-bottom left direction. Similarly, the fourth portion 1064 of the electrically conductive line 106 may essentially be arranged below the second sensor element 1042 as described in context with the arrangement of the second portion 1062 with respect to the at least one sensor element 104 in FIG. 2. The fourth portion 1064 may be considered as being arranged on a second side of the second sensor element 1042. A long axis of the fourth portion 1064 of the electrically conductive line 106 may, in various embodiments, have essentially the same direction as a long axis of the second sensor element 1042. In the embodiment as shown in FIG. 3A, both, the second sensor element 1042 and the fourth portion 1064 may have their long axes extending essentially in a top right-bottom left direction. The second portion 1062 and fourth portion 1064 may be electrically conductively connected by the second connecting portion 106c2. In the embodiment of FIG. 3A, the second connecting portion 106c2 may extend from the second portion 1062 to the fourth portion 1064. A long axis of the second connecting portion 106c2 may, in various embodiments, be essentially at a right angle to the long axis of the first sensor element 1041 and/or the second sensor element 1042. In other embodiments, an angle between the long axis of the first connecting portion 106c1 and the long axis of the first sensor element 1041 and/or the second sensor element 1042, respectively, may be different.

In various embodiments, the second portion 1062 and the fourth portion 1064 may be arranged in a common second level 213, e.g. the second level 213 as described in reference to FIG. 2. Furthermore, the second extension portion 106e2 and/or the second connecting portion 106c2 may be part of the second level 213. In various embodiments, the second portion 1062, the fourth portion 1064, and optionally one or both of the second connecting portion 106c2 and the second extension portion 106e2 may be formed in a common process. For example, a structured metal layer including the second portion 1062, the fourth portion 1064, and optionally one or both of the second connecting portion 106c2 and the second extension portion 106e2, may be formed, e.g. by deposition, e.g. structured deposition or deposition followed by structuring, e.g. using photolithography and partial removal of the metal layer.

In various embodiments, the second portion 1062, and optionally the fourth portion 1064, the second connecting portion 106c2, the second extension portion 106e2, etc., may be formed on a carrier 326. The carrier 326 may include or essentially consist of any suitable carrier 326, for example a rigid substrate, e.g. a semiconductor substrate or a carrier including or consisting of ceramics, one or more polymers, a metal, or a combination thereof. In a case of the carrier 326 including or essentially consisting of an electrically conductive material, an insulating material, e.g. a dielectric layer, may at least partially be arranged between the carrier 326 and electrically conductive portions arranged on the carrier 326, e.g. the second portion 1062, the fourth portion 1064, etc.

In various embodiments, the metal layer from which the first conducting portion 1041 and the third conducting portion 1063 may be structured, e.g. using photolithography, by arranging dielectric separation regions between portions of the electrically conductive material of the first level 211 that may not have direct electrically conductive contact. By way of example, as shown in FIG. 3A and FIG. 3B, between the third portion 1063 and a portion of the metal layer on which the second connection pad 318 may be arranged, a gap 319 (which may be filled by a dielectric material, e.g. air, a dielectric oxide, a dielectric polymer, or the like) may be formed. Similarly, between the at least one sensor line 320 and each of the first conducting portion 1061, the third conducting portion, and the first extension portion 106e1, at least one dielectric separation region may be arranged.

In various embodiments, by structuring the electrically conductive line 106, e.g. the electrically conductive layer, of the sensor arrangement 314, a direction of an electrical current 108 that may flow through the electrically conductive line 106 may be defined. The current 108 may thus have a first direction 1081 in the first portion 1061. The current 108 may further have a third direction 1083 in the third portion 1063. The first direction 1081 and the second direction 1082 are indicated by arrows in FIG. 3B. In the embodiment as shown in FIG. 3B, the third direction 1083 may be essentially opposite to the first direction 1081. In other embodiments, the third direction 1083 and the first direction 1081 may be arranged with a different relative orientation of the first direction 1081 and the third direction 1083.

In various embodiments, generalizing the exemplary case shown in FIG. 3A, FIG. 3B, FIG. 4A and FIG. 4B of the plurality of sensor elements 104 including two sensor elements 1041, 1042 to a case of the plurality of sensor elements 104 including n sensor elements 1041, . . . , 104n, with n being an integer equal to or larger than two, the electrically conductive line 106 may be arranged around each sensor element 1041, . . . , 104n of the plurality of n sensor elements 1041, . . . , 104n such that a (2×n−1)th portion 106(2n−1) of the electrically conductive line 106 may be arranged on a first side of an nth sensor element 104n of the plurality of n sensor elements, and such that a (2×n)th portion 106(2n) of the electrically conductive line 106 may be arranged on a second side opposite the first side of the nth sensor element 104n in such a way that if a current 108 is flowing through the electrically conductive line 106, the current has a (2×n−1)th direction 108(2n−1) in the (2×n−1)th portion 106(2n−1) and a (2×n)th direction 108(2n) opposite the (2×n−1)th direction 108(2n−1) in the (2×n)th portion 106(2n), such that a first magnetic field formed by the current in the (2×n−1)th portion 106(2n−1) and a second magnetic field formed by the current in the (2×n)th portion 106(2n) add constructively at a position of the nth sensor element 104n.

For the exemplary case shown in FIG. 3A, FIG. 3B, FIG. 4A and FIG. 4B of n=2, the electrically conductive line 106 may be arranged around each sensor element 1041, 1042 of the plurality of two sensor elements 1041, 1042 such that a third portion 1063 of the electrically conductive line 106 may be arranged on a first side of the second sensor element 1042 of the plurality of two sensor elements, and such that a fourth portion 1064 of the electrically conductive line 106 may be arranged on a second side opposite the first side of the second sensor element 1042 in such a way that if a current 108 is flowing through the electrically conductive line 106, the current has a third direction 1083 in the third portion 1063 and a fourth direction 1084 opposite the third direction 1083 in the 4th portion 1064, such that a first magnetic field formed by the current in the third portion 1063 and a second magnetic field formed by the current in the fourth portion 1064 add constructively at a position of the second sensor element 1042.

In various embodiments, the first portion 1061 and/or the second portion 1062 of the electrically conductive line 106 may be part of at least one electrically conductive layer, for example of two different electrically conductive layers. In various embodiments, the (2×n−1)th portion 106(2n−1) and/or the (2×n)th portion 106(2n) of the electrically conductive line 106 may be part of at least one electrically conductive layer, for example of two different electrically conductive layers. In various embodiments, the first portion 1061 and the (2×n−1)th portion 106(2n−1) may be part of the same electrically conductive layer. In various embodiments, the second portion 1062 and the (2×n)th portion 106(2n) may be part of the same electrically conductive layer.

In various embodiments, the sensor arrangement 314 may include an electrically conductive connection physically and electrically connecting the at least one portion (e.g. the third portion 1063 in FIG. 3A and FIG. 3B, in FIG. 2 this would be the first portion 1061, even though the electrically conductive connection is not shown there) of the electrically conductive line 106 that may be arranged on the first side of the at least one sensor element 104 to the at least one portion (e.g. the fourth portion 1064 in FIG. 4A and FIG. 4B, in FIG. 2 this would be the second portion 1062, even though the electrically conductive connection is not shown there) of the electrically conductive line 106 that may be arranged on the second side of the at least one sensor element 104.

In various embodiments, the sensor arrangement 314 may include an electrically conductive connection 430 between the first level 211 and the second level 213. The electrically conductive connection 430 may physically and electrically connect at least one portion, e.g. the third portion 1063, of the electrically conductive line 106 arranged in the first level 211 to at least one portion, e.g. the fourth portion 1064, of the electrically conductive line 106 arranged in the second level 213.

In various embodiments, the electrically conductive connection 430 may be a via. In other words, the electrically conductive line may include at least one electrically conductive connection 430, e.g. at least one via, electrically connecting the at least one portion of the electrically conductive line 106 on the first side of the at least one sensor element 104 to the at least one portion of the electrically conductive line 106 on the second side of the at least one sensor element 104. In the embodiment shown in FIG. 3A, FIG. 3B, FIG. 4A and FIG. 4B, the via may provide a physical and electrically conductive connection between the third portion 1063 of the electrically conductive line 1063, which may be part of a first level 211, and the fourth portion 1064 of the electrically conductive line 106, which may be part of a second level 213.

In various embodiments, referring to the generalized description of the arrangement used above, a physical and electrically conductive connection (e.g. a via) may be provided between the (2×n−1)th portion 106(2n−1) and the (2×n)th portion 106(2n) of the electrically conductive line 106.

In various embodiments, e.g. in a case of the sensor arrangement including only one sensor element 104, the electrically conductive line 106 may include at least one electrically conductive connection 430 electrically connecting the first portion 1061 of the electrically conductive line to the second portion 1062 of the electrically conductive line 106.

A reference to various portions of the electrically conductive line 106 as first portion 1061, second portion 1062, etc., and to which portion may be connected to which other portion by the electrically conductive connection 430 may just be considered a convention for describing a principle of shaping and/or arranging the electrically conductive line 106 in such a way around the at least one sensor element 104 that the current 108 may flow in the first direction 1081 in areas where the electrically conductive line 106 may be on the first side of the at least one sensor element 104, and in the second direction 1082 in areas where the electrically conductive line 106 may be on the second side opposite the first side of the at least one sensor element 104. In various embodiments, this arrangement may require the current 108 changing (e.g. at least once) from a first level 211 formed on the first side of the at least one sensor element 104 to a second level 213 formed on the second side of the at least one sensor element 104. The changing (in other words, the electrically conductive passage) from the first level 211 to the second level 213 may be provided by the electrically conductive connection 430.

In various embodiments, for example if the at least one sensor element 104 includes a plurality of sensor elements 104, the electrically conductive line 106 may be considered to form a first loop (e.g. in the first level) with the current 108 flowing in the first direction (e.g. a first rotation direction), and a second loop (e.g. in the second level) that may have the current 108 flowing in the opposite direction (e.g. a counter-rotating direction). In other words, the electrically conductive line 106 may include two electrically connected loops, e.g. lateral loops, with a counter-rotating current 108.

In various embodiments, the at least one electrically conductive connection, e.g. via, 430 may include a plurality of electrically conductive connections 430 (as shown in FIG. 4A and FIG. 4B), for example for channeling a larger current 108.

In various embodiments, at least one further electrically conductive connection, e.g. via, 432, e.g. a plurality of further electrically conductive connections 432, may be provided in the sensor arrangement 314. Comparing FIG. 4A and/or FIG. 4B to FIG. 3A and/or FIG. 3B, it may be recognized that the at least one further electrically conductive connection 432 may provide an electrically conductive connection between the second extension portion 106e2 and the second connection pad 318. In various embodiments, this may make it possible to have the first connection pad 316 (e.g. for having the current 108 enter the sensor arrangement 314) on a same side of the sensor arrangement 314 as the second connection pad 318 (e.g. for having the current 108 leave the sensor arrangement 314). In various embodiments, the second connection pad 318 may be arranged on a different side of the sensor arrangement 314 than the first connection pad 316. In that case, the at least one further electrically conductive connection 432 may not be required, or may be arranged connecting the electrically conductive line 106, e.g. the second extension portion 106e2, to the second connection pad 318 located essentially anywhere on the sensor arrangement 314, e.g. on a side of the sensor arrangement 314 opposite to the side of the sensor arrangement 314 on which the first connection pad may be arranged.

In various embodiments, the at least one further electrically conductive connection 432 may include a plurality of electrically conductive connections 432 (as shown in FIG. 4A and FIG. 4B), for example for channeling a larger current.

In various embodiments, the sensor arrangement 314 may include an electrically conductive sensor connection 436, for example a via, between the at least one sensor element 104 and the at least one sensor line 320. The electrically conductive sensor connection 436 may physically and electrically connect the at least one sensor element 104 to the at least one sensor line 320. In various embodiments, each sensor element 104 of a plurality of sensor elements 104 may be electrically connected to the at least one sensor line 320 by at least one of the at least one electrically conductive sensor connection 436. The electrically conductive sensor connection 436 may include a plurality of vias 436 for each sensor element 104 (as e.g. shown in FIG. 4A and FIG. 4B).

In various embodiments, the at least one electrically conductive connection 430 and/or the at least one further electrically conductive connection 432 and/or the at least one electrically conductive sensor connection 436 may be formed by processes known for forming vias, e.g. by forming an opening in an insulating material (in FIG. 4A and FIG. 4B, no insulating material is shown, but see e.g. FIG. 3A and/or FIG. 3B, in which an insulating material 330 that may be electrically insulating at least the first portion 1061, the second portion 1062, and the first sensor element 1041 laterally from each other (and similarly the third portion 1063, the fourth portion 1064, and the second sensor element 1042) is shown) and coating side walls of the opening with an electrically conductive material and/or filling the opening at least partially with an electrically conductive material. The electrically conductive material may for example include a metal or a metal alloy.

The electrically insulating material 330 may for example include or essentially consist of a polymer, e.g. a resin, and/or ceramics, and/or any other suitable electrically insulating material. The electrically insulating material 330 may for example include or essentially consist of a laminate. The electrically insulating material 330 may for example be or include a circuit board.

In various embodiments, the at least one sensor element 104 may be arranged inside the electrically insulating material 330. The least one sensor element 104 may for example be essentially completely surrounded, e.g. enclosed, by the electrically insulating material 330. In various embodiments, the insulating material 330 may be a laminate including a plurality of laminated layers, and the at least one sensor element 104 may be arranged between two of the laminated layers. In various embodiments, the at least one sensor element 140, e.g. the at least one XMR sensor element, may have insulating material 330 formed thereon, for example an oxide layer, a nitride layer, a polymer layer or the like, and the at least one insulated sensor element 104 may be arranged, e.g. laminated, between layers at least partially including the electrically conductive circuit 106. The layers may for example be part of the first level 211 and of the second level 213, respectively. The layers may for example include copper lines, also referred to as copper tracks, copper traces, copper conductors of copper circuits. In various embodiments, the at least one sensor element 104 may be only partially surrounded, e.g. enclosed, by the electrically insulating material 330. For example, the electrically insulating material 330 may only be formed on or over regions of the at least one sensor element 104, e.g. the chip 212 with the at least one sensor element 104, where the at least one sensor element 104 may need to be electrically separated from adjacent electrically conductive portions of the sensor arrangement 314.

FIG. 5 shows a perspective view of a sensor arrangement 314 according to various embodiments. The sensor arrangement 314 may be the sensor arrangement of FIG. 3A to FIG. 4B.

FIG. 5 may differ from FIG. 3A in that a direction is indicated (by an arrow 540) in which the current 108 may flow from the second extension portion 106e2 of the electrically conductive line 106, which may for example include or consist of copper traces, towards the second contact pad 318, e.g. essentially vertically through the at least one further electrically conductive connection 432.

In various embodiments, before leaving the sensor arrangement 314, the current 108 may have flowed in the electrically conductive line 106, which may for example include or consist of copper traces, for example in the second level 213, for example along the fourth portion 1064, the second connecting portion 106c2, the second portion 1062, the second extension portion 106e2 and the electrically conductive connection 430 of the electrically conductive line 106.

Figure 8:
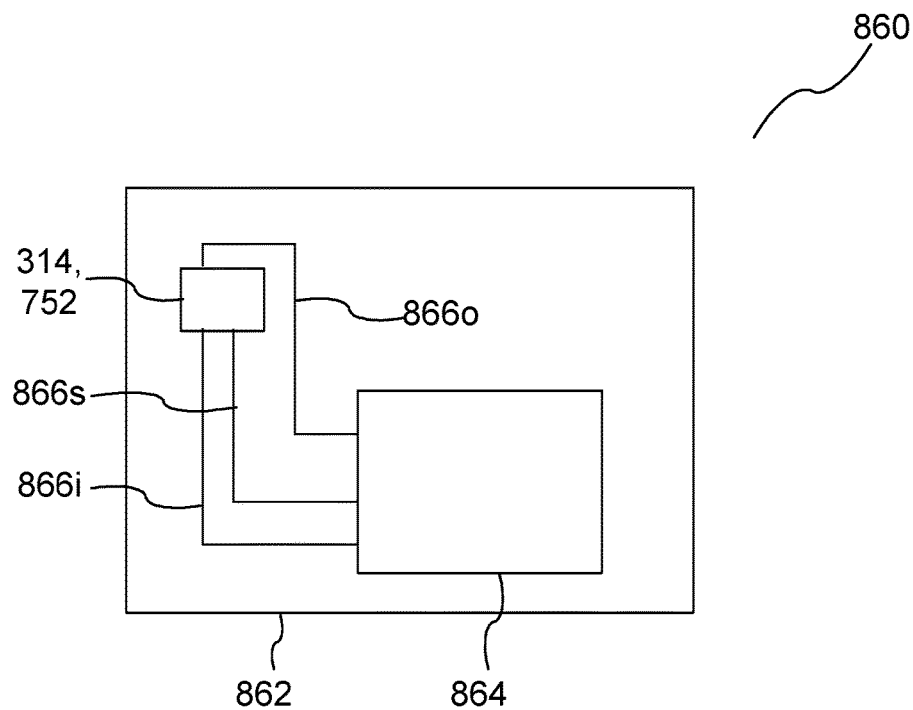
FIG. 8 shows a schematic diagram of a circuit arrangement according to various embodiments.

In various embodiments, the sensor arrangement 314 may be included in a circuit arrangement, see e.g. FIG. 8.

FIG. 6 shows a perspective view of a sensor arrangement 650 according to various embodiments. The sensor arrangement 650 may include the sensor arrangement 314 of FIG. 3A to FIG. 5. Properties, parameters, materials, methods etc. may thus not be repeated.

The sensor arrangement 650 of FIG. 6 may differ from the sensor arrangement 314 shown in, e.g., FIG. 5 in that the sensor arrangement 314 shown in FIG. 6 may include an encapsulation 646, 648. The encapsulation 646, 648 may at least partially, for example essentially completely, e.g. completely except for contact pads 316, 318, 320, encapsulate a sensor arrangement 314 according to various embodiments.

In various embodiments, the encapsulation 646, 648 may be formed having properties typically to be provided by an encapsulation, e.g. mechanical protection, protection from humidity, liquids, dust, and/or the like. In various embodiments, the encapsulation 646, 648 may be formed using one or more materials of known encapsulation materials, e.g. a polymer, a ceramic, a glass, and the like. The encapsulation material may, in various embodiments, be applied on all sides of the sensor arrangement 314. Alternatively, the encapsulation material may, in various embodiments, be applied on two or more, e.g. all, sides of the sensor arrangement 314.

In various embodiments, a thickness of the encapsulation 646, 648 may be in a range from about 1 μm to about 2 mm, for example from about 100 μm to about 1 mm.

In various embodiments, the encapsulated sensor arrangement 650 may be configured to be integrated, e.g. by a user, e.g. an end user, into various environments, circuits, and the like. In other words, the encapsulated sensor arrangement 650 may be considered an individual housed sensor arrangement, also referred to as a "standalone" sensor arrangement. An integration of such an individual housed sensor arrangement into a circuit may be performed by the user.

In various embodiments, for example in a case where the encapsulation 646, 648 may provide mechanical stability to the sensor arrangement, the at least one sensor element 104 may be considered as being embedded in a sensor body. In other words, the encapsulation 646, 648 may form the sensor body.

In various embodiments, the first portion 1061 of the electrically conductive line 106 may be formed over a first side of the sensor body, and the second portion 1062 of the electrically conductive line 106 may be formed over a second side of the sensor body opposite the first side of the sensor body.

Figure 7:
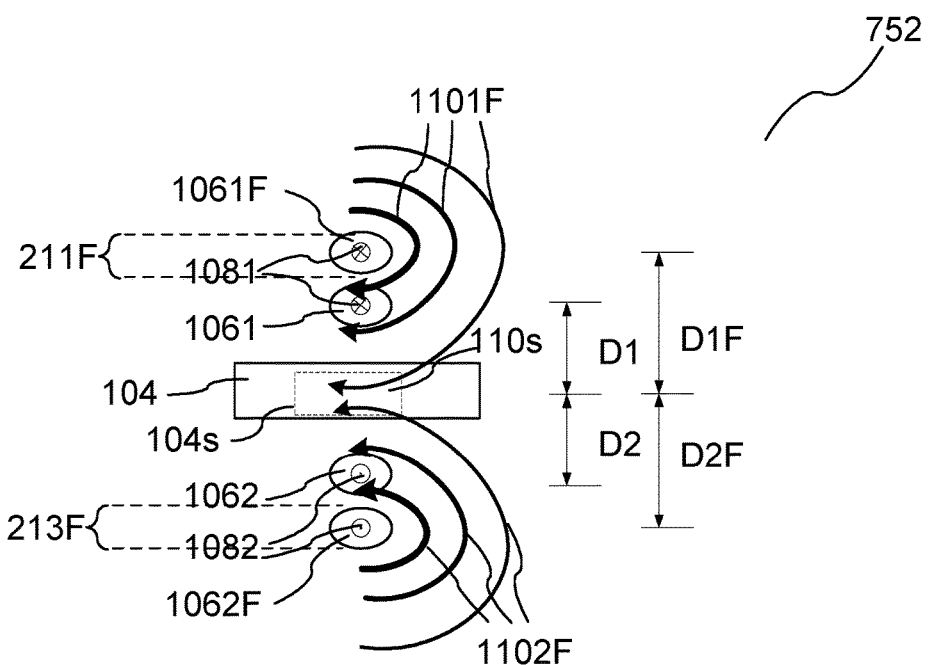
FIG. 7 shows a schematic cross-sectional view of a sensor arrangement according to various embodiments.

FIG. 7 shows a schematic cross-sectional view of a sensor arrangement 752 according to various embodiments.

The sensor arrangement according to view 201a of FIG. 2 may be considered as forming a basis for the sensor arrangement 752 of FIG. 7, and its elements, properties, etc. may not be repeated here. The sensor arrangement 752 may further include a further first portion 1061F and a further second portion 1062F of the electrically conductive line 106.

In various embodiments, the principles, materials, and the like of the sensor arrangement 752 shown in FIG. 7 may be essentially the same as for the sensor arrangement shown in view 201a of FIG. 2.

In various embodiments, the further first portion 1061F of the electrically conductive line 106 may be arranged on the same side of the at least one sensor element 104 as the first portion 1061 of the electrically conductive line 106, i.e. on the first side of the at least one sensor element 104.

In various embodiments, the further second portion 1062F of the electrically conductive line 106 may be arranged on the same side of the at least one sensor element 104 as the second portion 1062 of the electrically conductive line 106, i.e. on the second side of the at least one sensor element 104.

In various embodiments, the further first portion 1061F and the further second portion 1062F of the electrically conductive line 106 may be arranged according to the principles outlined above in context with the first portion 1061 and the second portion 1062 of the electrically conductive line 106. As a consequence, the first further magnetic field 1101F that may be formed by the current 108 that may be configured to flow in the further first portion 1061F may superpose at least partly constructively, in other words add at least partially constructively, with the second further magnetic field 1102F that may be formed by the current 108 that may be configured to flow in the further second portion 1062F.

In various embodiments, the current 108 in the further first portion 1061F may have essentially the same direction 1081 as the current 108 in the first portion 1061, and the current 108 in the further second portion 1062F may have essentially the same direction 1082 as the current 108 in the second portion 1062.

In various embodiments, the magnetic field of the further first portion 1101F may have essentially the same direction at the sensing portion 104s as the magnetic field 1101 of the first portion 1061, and may and have essentially the same direction as the magnetic field 1102 of the second portion 1062 at the sensing portion 104s. In other words, the first further magnetic field 1101F and the second further magnetic field 1102F may add constructively at the sensing portion 104s of the at least one sensor element 104. The first further magnetic field 1101F and the second further magnetic field 1102F may cause a signal in the at least one sensor element 104 that may be higher than the signal without the first further magnetic field 1101F and the second further magnetic field 1102F.

In various embodiments, at least one further electrically conductive connection (not shown), e.g. at least one further via, may be provided for electrically connecting at least one of the further first portion 1061F and the further second portion 1062F to at least one other portion (e.g. to the first portion 1061, the second portion 1062, or the first extension portion 106e1, etc.)

In various embodiments, the further first portion 1061F may be part of a first further level 211F, and/or the further second portion 1062F may be part of a second further level 213F. The at least one further electrically conductive connection, e.g. the at least one further via, may be configured to electrically connect the further first portion 1061F in the first further level 211F to the further second portion 1062F in the second further level 213F.

In various embodiments, a distance D1F between the further first portion 1061F and the at least one sensor 104 may be larger than the distance D1 between the first portion 1061 and the at least one sensor 104. a distance D2F between the further second portion 1062F and the at least one sensor 104 may be larger than the distance D2 between the second portion 1062 and the at least one sensor 104. As a consequence, the first portion 1061 may be arranged between the further first portion 1061F and the at least one sensor 104, and the second portion 1062 may be arranged between the further second portion 1062F and the at least one sensor 104.

In other words, in various embodiments, the sensor arrangement 752 may further include a further first portion 1061F of the electrically conductive line 106 being arranged on the first side of the at least one sensor element 104 and a further second portion 1062F of the electrically conductive line 106 being arranged on the second side of the at least one sensor element 104 in such a way that if a current 108 is flowing through the electrically conductive line 106, the current 108 has the first direction 1081 in the further first portion 1061F and the second direction 1082 in the further second portion 1062F, wherein the first portion 1061 may be arranged between the at least one sensor element 104 and the further first portion 1061F, and the second portion 1062 may be arranged between the at least one sensor element 104 and the further second portion 1062.

In various embodiments, in a similar manner as shown here, further portions may be added, e.g. on the first side and the second side of the second sensor 1042, etc. (not shown). Furthermore, in various embodiments, additional further portions may be added on the first side and on the second side of the at least one sensor element 104 at successively increasing distances from the at least one sensor element 104. However, the strength of the magnetic field may decrease with increasing distance. As a consequence, the successively more distant portions may add successively smaller contributions to the signal formed in the sensing portion 104s of the at least one sensor element 104.

FIG. 8 shows a schematic diagram of a circuit arrangement 860 according to various embodiments.

In various embodiments, the circuit arrangement 860 may include a carrier 862, a semiconductor device 864, a sensor arrangement in accordance with various embodiments, for example the sensor arrangement 314 or 752 as described above, an electrically conductive input line 866i, an electrically conductive output line 866o, and at least one electrically conductive outer sensor line 866s.

The carrier 862 may be any kind of suitable carrier, for example a circuit board, e.g. a printed circuit board, or a semiconductor carrier.

The semiconductor device 864 may be any kind of suitable semiconductor device 864, for example a semiconductor device 864 that may require a current to be detected and/or measured, for example a transistor, for example a power transistor.

In various embodiments, the sensor arrangement 314, 752 and the semiconductor device 864 may be arranged on the carrier 862.

In various embodiments, the sensor arrangement 314, 752 and the semiconductor device 864 may be electrically connected by the electrically conductive input line 866i and the electrically conductive output line 866o. The current to be detected and/or measured may flow through the electrically conductive input line 866i, the electrically conductive line 106 of the sensor arrangement 314, 752 and the electrically conductive output line 866o. The electrically conductive input line 866i may be electrically conductively connected to the first connection pad 316, for example as described above. The electrically conductive output line 866o may be electrically conductively connected to the second connection pad 318, for example as described above.

In various embodiments, a signal that may be generated in at least one sensor element 104 of the sensor arrangement 314, 752 as described above may be transmitted, e.g. to the semiconductor device 864, by the at least one electrically conductive outer sensor line 866s. In various embodiments, a plurality of electrically conductive outer sensor line 866s may be provided, for example one electrically conductive outer sensor line 866s for each sensor element 104 of the at least one sensor element 104.

In various embodiments, further sensor elements, e.g. a temperature element, may be included in the circuit arrangement 860.

In various embodiments, the circuit arrangement 860 may include further semiconductor devices.

In other words, in various embodiments, the sensor arrangement 314, 752 may be part of a multi-functional circuit board.

Figure 9:
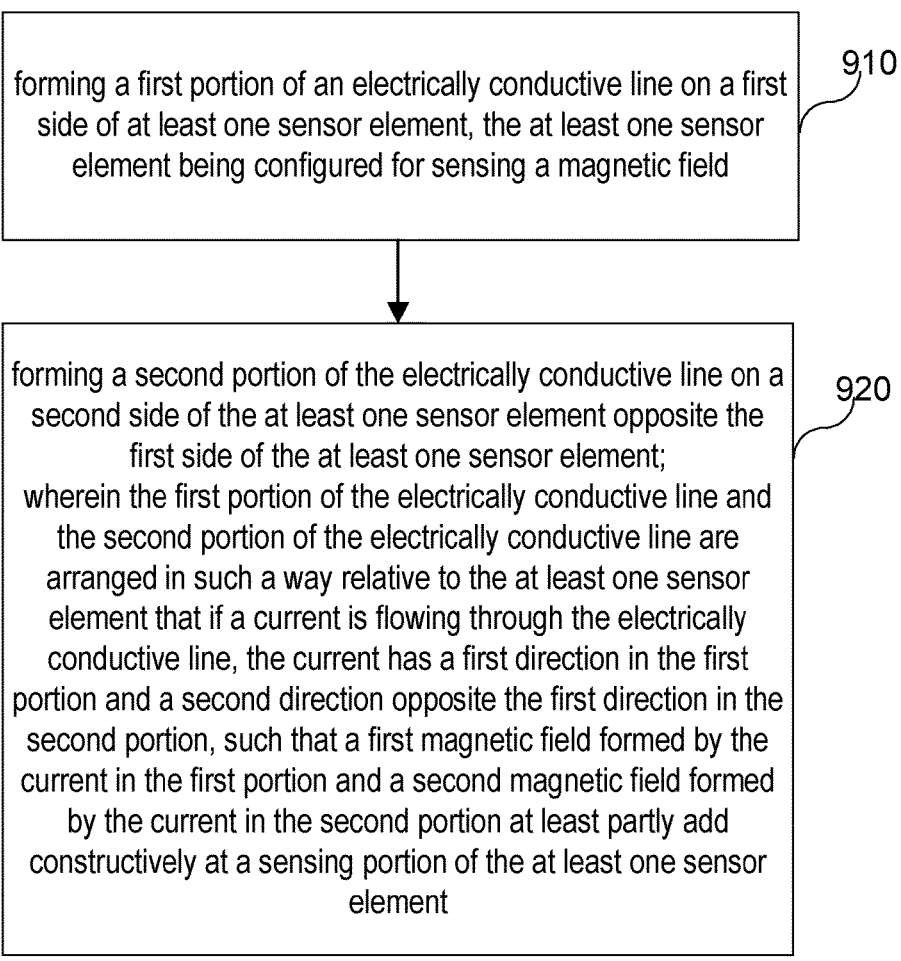
FIG. 9 shows a schematic diagram of a method of forming a sensor arrangement in accordance with various embodiments.

FIG. 9 shows a schematic diagram 900 of a method of forming a sensor arrangement in accordance with various embodiments.

In various embodiments, the method of forming the sensor arrangement may include forming a first portion of an electrically conductive line on a first side of at least one sensor element, the at least one sensor element being configured for sensing a magnetic field (in 910), and forming a second portion of the electrically conductive line on a second side of the at least one sensor element opposite the first side of the at least one sensor element, wherein the first portion of the electrically conductive line and the second portion of the electrically conductive line may be arranged in such a way relative to the at least one sensor element that if a current is flowing through the electrically conductive line, the current has a first direction in the first portion and a second direction opposite the first direction in the second portion, such that a first magnetic field formed by the current in the first portion and a second magnetic field formed by the current in the second portion may at least partly add constructively at a sensing portion of the at least one sensor element (in 920).

In various embodiments, the method may further include embedding the at least one sensor element in a sensor body, for example laminating the at least one sensor element into the sensor body.

In various embodiments, the arranging the first portion of the electrically conductive line and/or the arranging the second portion of the electrically conductive line may include forming an electrically conductive layer. The forming the electrically conductive layer may for example include depositing and/or electroplating.

In various embodiments, the method may further include forming, as part of the electrically conductive line, an electrically conductive connection between the first portion of the electrically conductive line and the second portion of the electrically conductive line.

The electrically conductive connection may for example be formed as a via, for example by forming an opening, e.g. in a sensor body, for example from a first side or from a second side of the sensor body to the at least one sensor element, and by coating and/or filling the opening with an electrically conductive material, e.g. a metal or a metal alloy.

In various embodiments, a sensor arrangement may be provided. The sensor arrangement may include at least one sensor element having a first side and a second side opposite the first side and configured for sensing a magnetic field; and an electrically conductive line, wherein a first portion of the electrically conductive line may be arranged on the first side of the at least one sensor element and a second portion of the electrically conductive line may be arranged on the second side of the at least one sensor element in such a way that if a current is flowing through the electrically conductive line, the current has a first direction in the first portion and a second direction opposite the first direction in the second portion, such that a first magnetic field formed by the current in the first portion and a second magnetic field formed by the current in the second portion may at least partly add constructively at a sensing portion of the at least one sensor element.

In various embodiments, the at least one sensor element may be embedded in a sensor body, the first portion of the electrically conductive line may be formed over a first side of the sensor body and the second portion of the electrically conductive line may be formed over a second side of the sensor body opposite the first side of the sensor body.

In various embodiments, the sensor arrangement may further include a further first portion of the electrically conductive line being arranged on the first side of the at least one sensor element and a further second portion of the electrically conductive line being arranged on the second side of the at least one sensor element in such a way that if a current is flowing through the electrically conductive line, the current has the first direction in the further first portion and the second direction in the further second portion, wherein the first portion is arranged between the at least one sensor element and the further first portion, and the second portion is arranged between the at least one sensor element and the further second portion.

In various embodiments, the at least one sensor element may be at least one of a group of sensor elements, the group consisting of an XMR sensor, an AMR sensor, a GMR sensor, and a TMR sensor.

In various embodiments, the at least one sensor element may include a plurality of n sensor elements, n being an integer equal to or larger than 2.

In various embodiments, the electrically conductive line may be arranged around each sensor element of the plurality of n sensor elements such that a $(2 \times n-1)$th portion of the electrically conductive line may be arranged on a first side of an nth sensor element of the plurality of n sensor elements and a $(2 \times n)$th portion of the electrically conductive line may be arranged on a second side opposite the first side of the nth sensor element in such a way that if a current is flowing through the electrically conductive line, the current has a $(2 \times n-1)$th direction in the $(2 \times n-1)$th portion and a $(2 \times n)$th direction opposite the $(2 \times n-1)$th direction in the $(2 \times n)$th portion, such that a first magnetic field formed by the current in the $(2 \times n-1)$th portion and a second magnetic field formed by the current in the $(2 \times n)$th portion add constructively at a position of the nth sensor element.

In various embodiments, the plurality of sensor elements may be coupled in a bridge configuration providing a cumulative signal from the plurality of sensor elements.

In various embodiments, the electrically conductive line may include at least one via electrically connecting the first portion of the electrically conductive line to the second portion of the electrically conductive line. In various embodiments, the electrically conductive line may include at least one via electrically connecting the $(2 \times n-1)$th portion to the $(2 \times n)$th portion of the electrically conductive line.

In various embodiments, the first portion and/or the second portion of the electrically conductive line comprise/s an electrically conductive layer. In various embodiments, the $(2 \times n-1)$th portion and/or the $(2 \times n)$th portion of the electrically conductive line may include an electrically conductive layer.

In various embodiments, a circuit arrangement is provided. The circuit arrangement may include a carrier, a semiconductor device and the sensor arrangement, wherein the sensor arrangement and the semiconductor device may be arranged on the carrier.

In various embodiments, a method of manufacturing a sensor arrangement is provided. The method may include forming a first portion of an electrically conductive line on a first side of at least one sensor element, the at least one sensor element being configured for sensing a magnetic field, and forming a second portion of the electrically conductive line on a second side of the at least one sensor element opposite the first side of the at least one sensor element, wherein the first portion of the electrically conductive line and the second portion of the electrically conductive line may be arranged in such a way relative to the at least one sensor element that if a current is flowing through the electrically conductive line, the current has a first direction in the first portion and a second direction opposite the first direction in the second portion, such that a first magnetic field formed by the current in the first portion and a second magnetic field formed by the current in the second portion may at least partly add constructively at a sensing portion of the at least one sensor element. In various embodiments, the method may further include embedding the at least one sensor element in a sensor body.

In various embodiments, the arranging the first portion of the electrically conductive line and/or the arranging the second portion of the electrically conductive line may include forming an electrically conductive layer.

In various embodiments, the method may further include forming, as part of the electrically conductive line, an electrically conductive connection between the first portion of the electrically conductive line and the second portion of the electrically conductive line.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:
1. A sensor arrangement comprising:
at least one sensor element having a first side and a second side opposite the first side and configured for sensing a magnetic field; and
an electrically conductive line;

wherein a first portion of the electrically conductive line is arranged on the first side of the at least one sensor element and a second portion of the electrically conductive line is arranged on the second side of the at least one sensor element in such a way that if a current is flowing through the electrically conductive line, the current has a first direction in the first portion and a second direction opposite the first direction in the second portion, such that a first magnetic field formed by the current in the first portion and a second magnetic field formed by the current in the second portion at least partly add constructively at a sensing portion of the at least one sensor element and wherein the first portion and the second portion are in different planes that are parallel to the at least one sensor element.

2. The sensor arrangement of claim 1,
wherein the at least one sensor element is embedded in a sensor body, the first portion of the electrically conductive line is formed over a first side of the sensor body and the second portion of the electrically conductive line is formed under a second side of the sensor body opposite the first side of the sensor body.

3. The sensor arrangement of claim 1, further comprising:
a further first portion of the electrically conductive line being arranged on the first side of the at least one sensor element and a further second portion of the electrically conductive line being arranged on the second side of the at least one sensor element in such a way that if a current is flowing through the electrically conductive line, the current has the first direction in the further first portion and the second direction in the further second portion, wherein the first portion is arranged between the at least one sensor element and the further first portion, and the second portion is arranged between the at least one sensor element and the further second portion.

4. The sensor arrangement of claim 3,
wherein the first portion, the further first portion, the second portion, and the further second portion are in different planes that are parallel to the at least one sensor element.

5. The sensor arrangement of claim 1,
wherein the at least one sensor element is at least one of a group of sensor elements, the group consisting of:
an XMR sensor;
an AMR sensor;
a GMR sensor; and
a TMR sensor.

6. The sensor arrangement of claim 1,
wherein the at least one sensor element comprises a plurality of n sensor elements, n being an integer equal to or larger than 2.

7. The sensor arrangement of claim 6,
wherein the electrically conductive line is arranged around each sensor element of the plurality of n sensor elements such that a $(2 \times n-1)$th portion of the electrically conductive line is arranged on a first side of an nth sensor element of the plurality of n sensor elements and a $(2 \times n)$th portion of the electrically conductive line is arranged on a second side opposite the first side of the nth sensor element in such a way that if a current is flowing through the electrically conductive line, the current has a $(2 \times n-1)$th direction in the $(2 \times n-1)$th portion and a $(2 \times n)$th direction opposite the $(2 \times n-1)$th direction in the $(2 \times n)$th portion, such that a first magnetic field formed by the current in the $(2 \times n-1)$th portion and a second magnetic field formed by the current in the $(2 \times n)$th portion add constructively at a position of the nth sensor element.

8. The sensor arrangement of claim 7,
wherein the plurality of sensor elements is coupled in a bridge configuration
providing a cumulative signal from the plurality of sensor elements.

9. The sensor arrangement of claim 6,
wherein the electrically conductive line comprises at least one via electrically connecting the $(2 \times n-1)$th portion to the $(2 \times n)$th portion of the electrically conductive line.

10. The sensor arrangement of claim 6,
wherein the $(2 \times n-1)$th portion and/or the $(2 \times n)$th portion of the electrically conductive line comprise/s an electrically conductive layer.

11. The sensor arrangement of claim 1,
wherein the electrically conductive line comprises at least one via electrically connecting the first portion of the electrically conductive line to the second portion of the electrically conductive line.

12. The sensor arrangement of claim 1,
wherein the first portion and/or the second portion of the electrically conductive line comprise/s an electrically conductive layer.

13. A circuit arrangement, comprising:
a carrier;
a sensor arrangement comprising:
at least one sensor element having a first side and a second side opposite the first side and configured for sensing a magnetic field; and
an electrically conductive line;
wherein a first portion of the electrically conductive line is arranged on the first side of the at least one sensor element and a second portion of the electrically conductive line is arranged on the second side of the at least one sensor element in such a way that if a current is flowing through the electrically conductive line, the current has a first direction in the first portion and a second direction opposite the first direction in the second portion, such that a first magnetic field formed by the current in the first portion and a second magnetic field formed by the current in the second portion at least partly add constructively at a sensing portion of the at least one sensor element and wherein the first portion and the second portion are in different planes that are parallel to the at least one sensor element; and
a semiconductor device;
wherein the sensor arrangement and the semiconductor device are arranged on the carrier.

14. The circuit arrangement of claim 13, further comprising:
a further first portion of the electrically conductive line being arranged on the first side of the at least one sensor element and a further second portion of the electrically conductive line being arranged on the second side of the at least one sensor element in such a way that if a current is flowing through the electrically conductive line, the current has the first direction in the further first portion and the second direction in the further second portion, wherein the first portion is arranged between the at least one sensor element and the further first portion, and the second portion is arranged between the at least one sensor element and the further second portion.

15. The circuit arrangement of claim 14,
wherein the first portion, the further first portion, the second portion, and the further second portion are in different planes that are parallel to the at least one sensor element.

16. The circuit arrangement of claim 13,
wherein the electrically conductive line is arranged around each sensor element of the plurality of n sensor elements such that a (2×n−1)th portion of the electrically conductive line is arranged on a first side of an nth sensor element of the plurality of n sensor elements and a (2×n)th portion of the electrically conductive line is arranged on a second side opposite the first side of the nth sensor element in such a way that if a current is flowing through the electrically conductive line, the current has a (2×n−1)th direction in the (2×n−1)th portion and a (2×n)th direction opposite the (2×n−1)th direction in the (2×n)th portion, such that a first magnetic field formed by the current in the (2×n−1)th portion and a second magnetic field formed by the current in the (2×n)th portion add constructively at a position of the nth sensor element.

17. A method of manufacturing a sensor arrangement, the method comprising:
forming a first portion of an electrically conductive line on a first side of at least one sensor element, the at least one sensor element being configured for sensing a magnetic field; and
forming a second portion of the electrically conductive line on a second side of the at least one sensor element opposite the first side of the at least one sensor element;
wherein the first portion of the electrically conductive line and the second portion of the electrically conductive line are in different planes that are parallel to the at least one sensor element and arranged in such a way relative to the at least one sensor element that if a current is flowing through the electrically conductive line, the current has a first direction in the first portion and a second direction opposite the first direction in the second portion, such that a first magnetic field formed by the current in the first portion and a second magnetic field formed by the current in the second portion at least partly add constructively at a sensing portion of the at least one sensor element.

18. The method of claim 17, further comprising:
embedding the at least one sensor element in a sensor body.

19. The method of claim 17,
wherein the arranging the first portion of the electrically conductive line and/or the arranging the second portion of the electrically conductive line comprises forming an electrically conductive layer.

20. The method of claim 17, further comprising:
forming, as part of the electrically conductive line, an electrically conductive connection between the first portion of the electrically conductive line and the second portion of the electrically conductive line.

* * * * *